Dec. 14, 1965  E. O. SCHWEITZER, JR  3,223,889
MEANS FOR PROTECTING POWER CIRCUITS AND THE LIKE
Filed Jan. 22, 1963  6 Sheets-Sheet 4
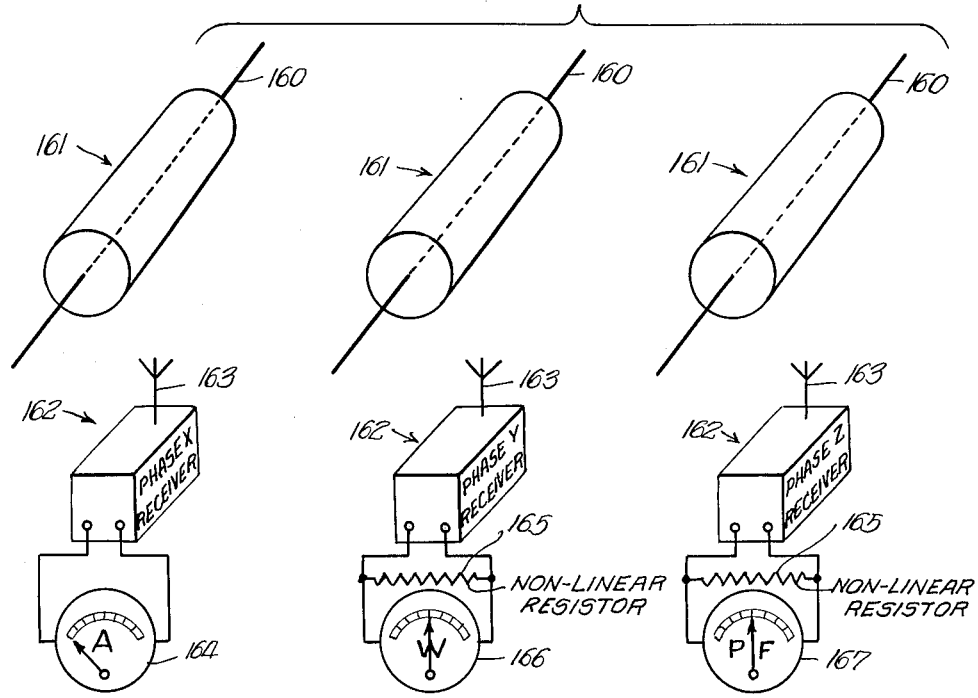
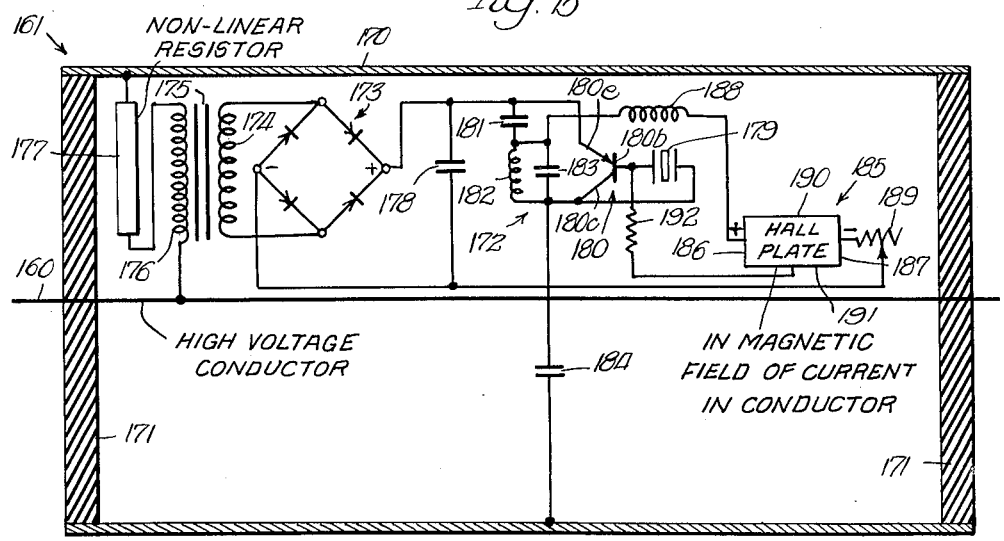

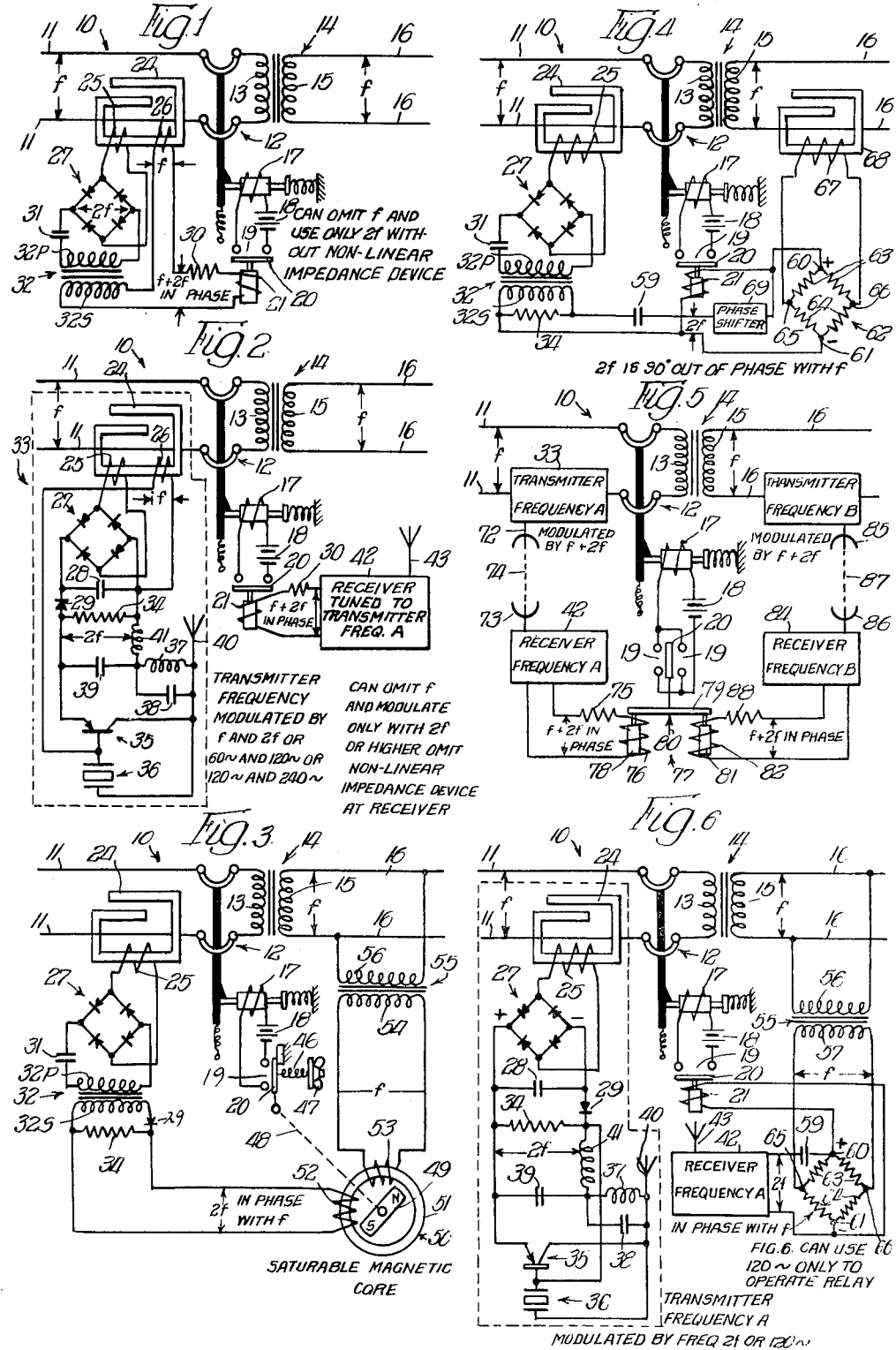

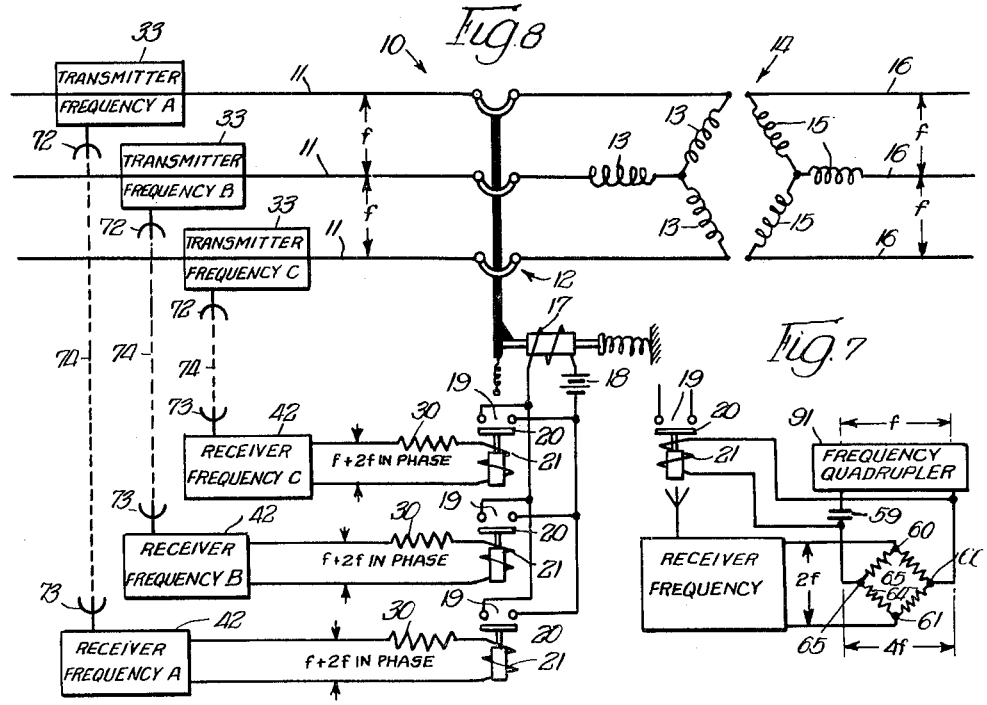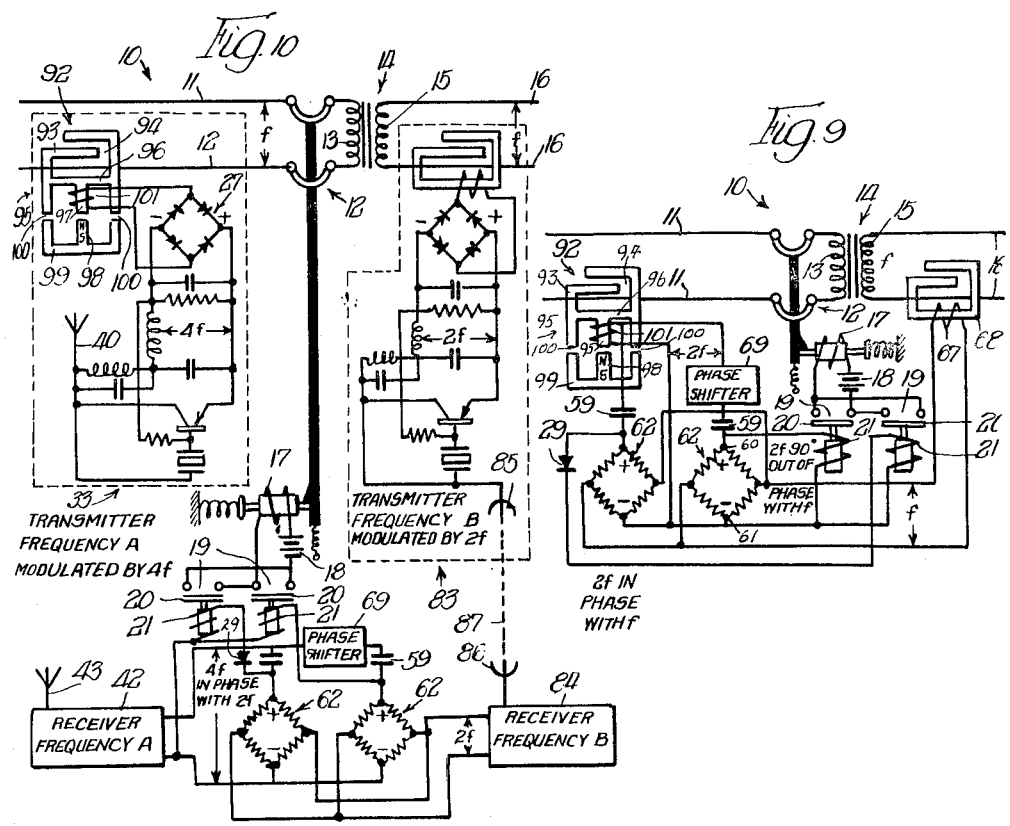

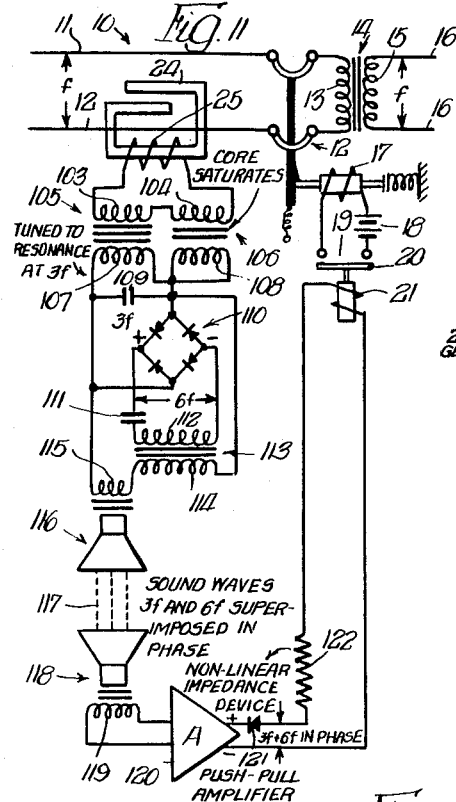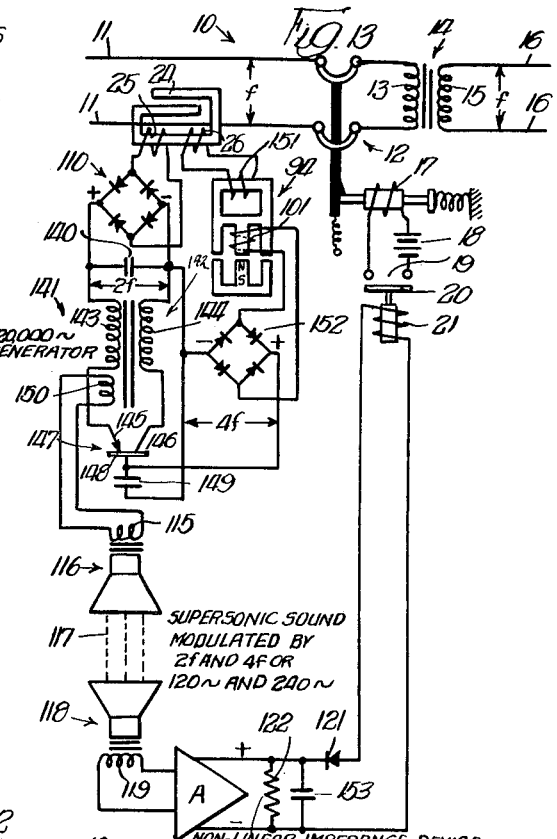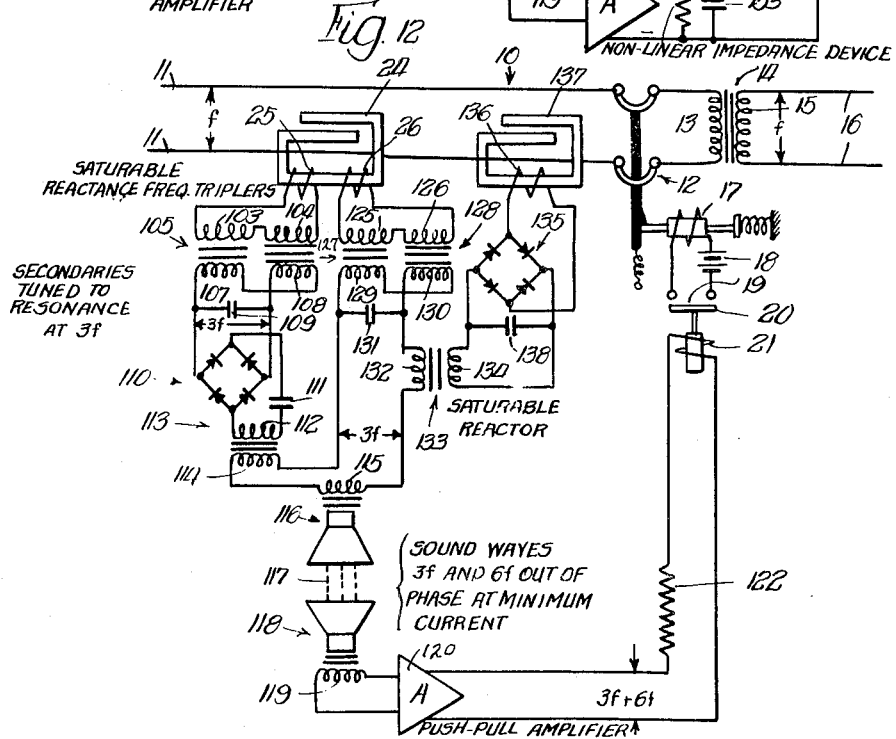

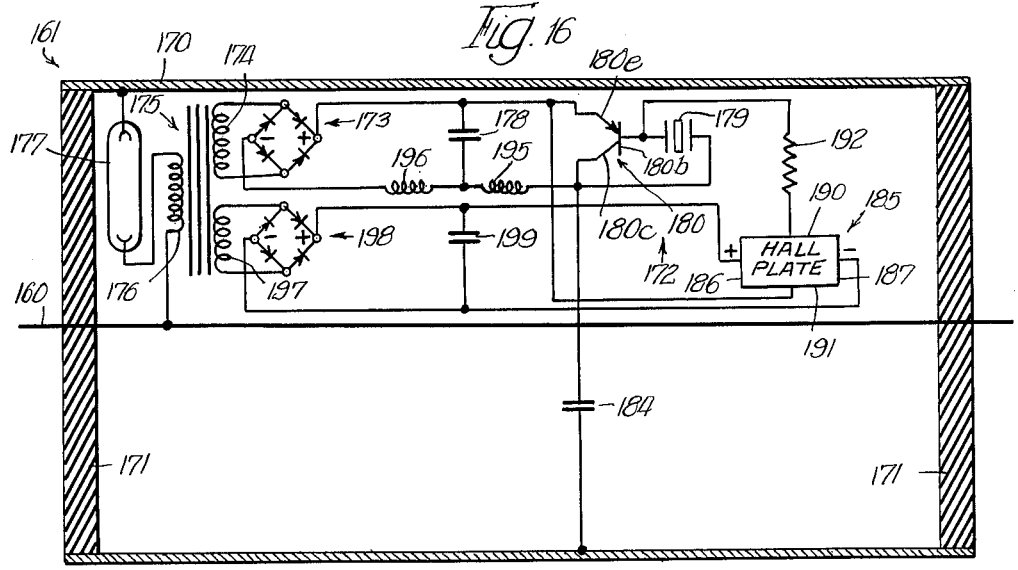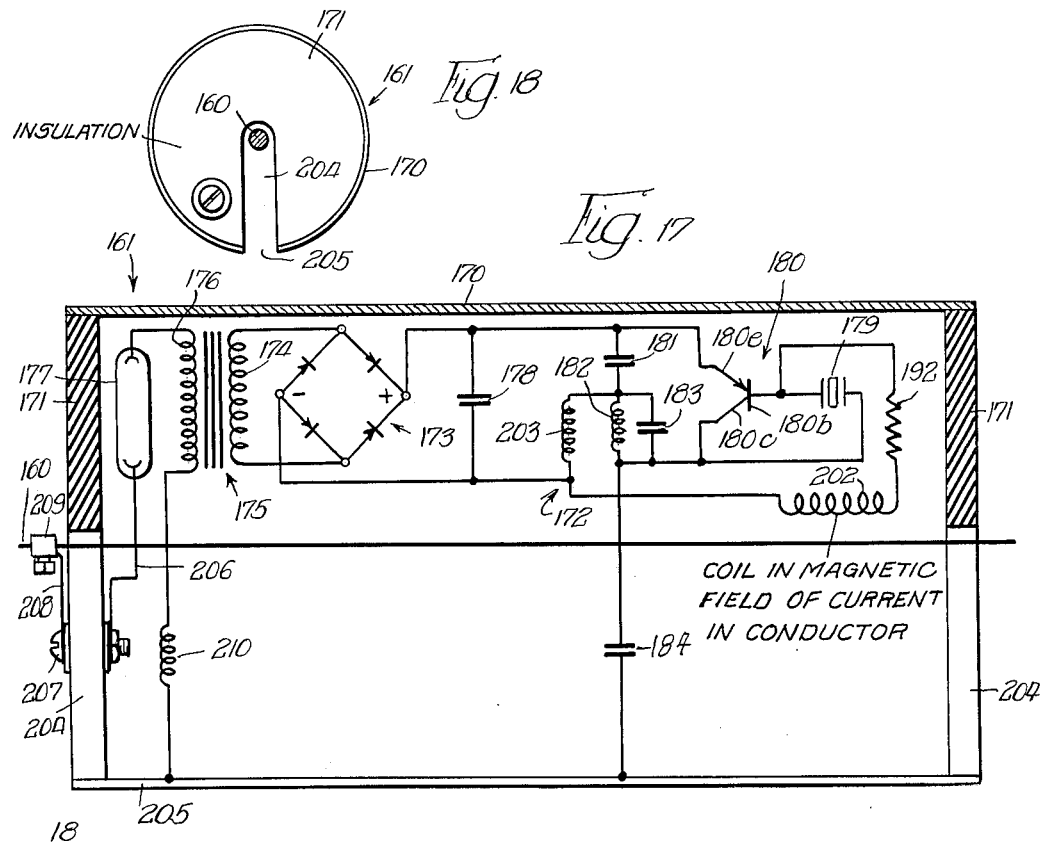

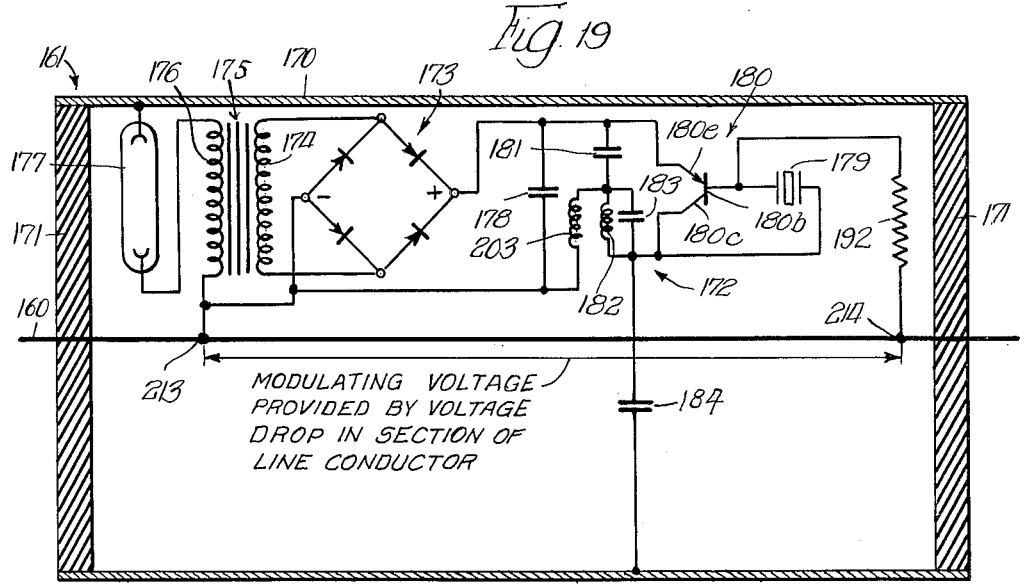
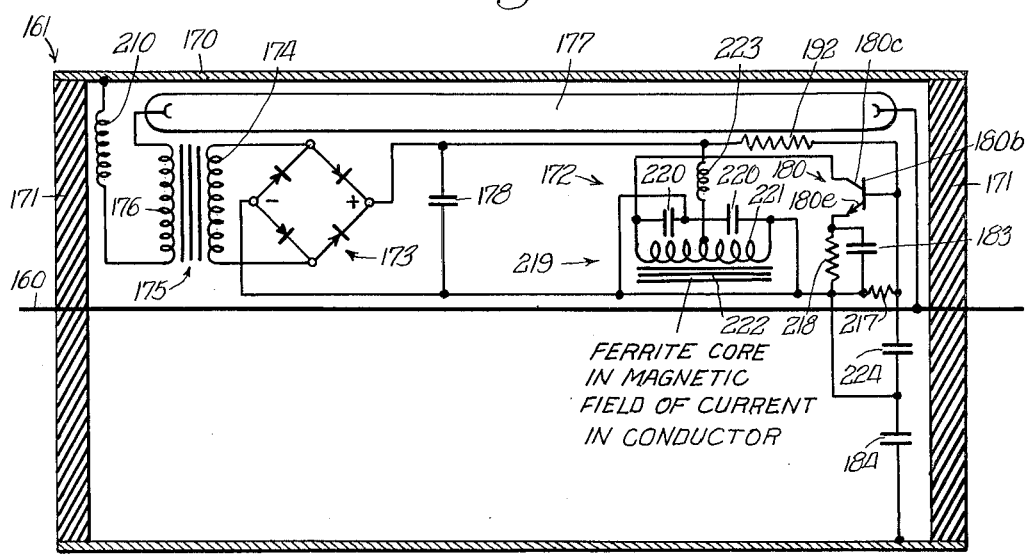

United States Patent Office 3,223,889
Patented Dec. 14, 1965

3,223,889
MEANS FOR PROTECTING POWER CIRCUITS AND THE LIKE
Edmund O. Schweitzer, Jr., 1002 Dundee Road, Northbrook, Ill.
Filed Jan. 22, 1963, Ser. No. 253,100
46 Claims. (Cl. 317—14)

This application is a continuation-in-part of my application Serial No. 118,484, filed May 15, 1961.

This invention relates to protecting means for electric power systems and the like. It constitutes an improvement over the inventions disclosed in my U.S. Patents No. 2,724,821, issued November 22, 1955; No. 3,007,-042, issued October 31, 1961; and No. 3,005,134, issued October 17, 1961.

Among the objects of this invention are: To provide for deenergizing a load circuit connected for energization to a power supply circuit of an alternating current power transmission system upon the occurrence of a fault in the load circuit in a new and improved manner; to derive from the electric power transmission system an alternating current having a frequency that is two or more times the frequency of the alternating current in the system and whose magnitude is a function of the magnitude of the alternating current flowing into the system and to utilize such derived current for effecting deenergization of the load circuit; to derive from the electric power system simultaneously a fundamental frequency and its second harmonic and magnitudes of which are functions of the magnitude of the alternating current flowing in the system and to utilize them for tripping a circuit interrupter to deenergize the load circuit; to convert one or both of the derived frequencies into a wave form of energy capable of being transmited through the atmosphere without the use of electrical conducting means interconnecting the transmitting and receiving stations, to receive such energy, and to reconvert it into an alternating current or currents corresponding to the derived frequency or frequencies for use in tripping the circuit interrupter; to convert the derived frequency or frequencies into radio waves; to convert the derived frequency or frequencies into sound waves; to direct the wave form of energy along a predetermined path having a limited transverse dimension such that the energy is prevented from radiating transversely substantially beyond such path; to derive the frequency or frequencies from each phase of polyphase alternating current power transmission system and to modulate a carrier frequency therewith, there being a different carrier frequency for each phase; to apply the derived fundamental and second harmonic frequency currents to a non-linear impedance device for providing a unidirectional effect that is a function of the magnitude of the alternating current flow in the electric power system and to utilize such effect to deenergize the load circuit; to derive from one of the circuits a fundamental frequency and from the other of the circuits a second harmonic thereof and to cause such derived frequencies to interact in such manner as to effect disconnection of the circuits when there is a predetermined difference in the current flows in the circuits; to shift one of the derived frequencies 90° out of phase with the other and to apply them to non-linear impedance means for obtaining a flow of direct current upon predetermined shifting of the phase of the alternating current flow in one of the circuits with respect to that in the other of the circuits; to provide in a single control system for over current and differential tripping of the circuit interrupter by employing a combination of a fundamental frequency and a second harmonic thereof derived from the power supply circuit and from the load circuit; to energize a radio transmitter operating at the potential of a high voltage alternating current power transmission conductor in response to the voltage of the electric field of the conductor and to modulate the output of the transmitter in response to current flow in the conductor; to position a metallic cylinder in concentric insulated spaced relation on the conductor and to derive the energization for the transmitter from connections to the cylinder and to the conductor; to introduce in the circuit between the metallic cylinder and the conductor a non-linear resistor, such as a thyrite resistor or a gas filled tube, for increasing the charging current in this circuit and thereby the power available for energizing the transmitter; to locate the transmitter within the metallic cylinder where it is shielded thereby from the weather and from the effects of corona; to obtain the modulation for the transmitter from a Hall plate located in the magnetic field of the current in the conductor; to provide for applying the metallic cylinder to the conductor through the use of a slot in one side of the cylinder and radial slots in the end insulators; and to frequency modulate the transmitter in response to the current flow in the conductor.

Other objects of this invention will, in part, be obvious and in part appear hereinafter.

In the drawings:

FIG. 1 is a circuit diagram showing how the present invention can be employed for overload protection in the event that a fault develops in the power system.

FIG. 2 shows how the system illustrated in FIG. 1 can be utilized with a radio link between the high voltage power supply circuit and the trip control means.

FIG. 3 shows another form of over current protection means employing a different form of non-linear impedance device and deriving the fundamental frequency from the load circuit and the second harmonic from the power supply circuit.

FIG. 4 shows how the present invention can be employed for differential protection of a transformer.

FIG. 5 illustrates how the differential protection can be effected employing a radio link between the power supply circuit and the control apparatus and another radio link between the load circuit and the control apparatus.

FIG. 6 illustrates an over current protection system embodying the present invention in which a radio link is employed between the power supply circuit and the trip control means and in which the fundamental frequency is obtained from the load circuit.

FIG. 7 shows a part of the circuit that can be substituted for a corresponding part of the circuit shown in FIG. 6 in order to obtain a frequency from the load circuit which is a second harmonic of the double frequency that is obtained from the power supply circuit.

FIG. 8 shows how the present invention can be employed in conjunction with a polyphase alternating current supply system.

FIG. 9 illustrates how the present invention can be employed to provide both over current and differential protection.

FIG. 10 illustrates a system in which radio links are employed in a system of the type shown in FIG. 9 to provide both over current and differential protection.

FIG. 11 shows how the present invention can be employed using sound waves for transmitting energy from the power supply circuit to the trip control means for operating the circuit interrupter.

FIG. 12 shows another embodiment of the system employing the transmission of energy by sound waves from the power supply circuit for operating the trip means to open the circuit interrupter.

FIG. 13 shows how a supersonic frequency can be modulated by a fundamental and a second harmonic derived from the alternating current in the electric power system and transmitted by sound waves to effect the operation of the trip means for opening the circuit interrupter under over current conditions.

FIG. 14 shows diagrammatically and in perspective how radio transmitters can be mounted within metallic cylinders surrounding transmission line conductors for the purpose of making voltage and current measurements with respect to the individual conductors and transmitting to remotely located radio receivers indications corresponding to these variables.

FIG. 15 is a vertical sectional view through one of the transmitters illustrated in FIG. 14 with the circuit connections for the apparatus therein being shown in diagrammatic form.

FIG. 16 is a view, similar to FIG. 15, and showing a modification of the Hall plate connections.

FIG. 17 is a view, similar to FIG. 15, that shows another form of current pickup device and the transmitter is arranged for mounting on the conductor after the conductor has been installed and for making an external connection to the conductor.

FIG. 18 is a view, in end elevation and at a reduced scale, of the device shown in FIG. 17, the conductor being shown in section.

FIG. 19 is a view, similar to FIG. 15, but showing how the current response can be obtained by taking the drop along the conductor the voltage of which is a function of the magnitude of current flow.

FIG. 20 is a view, similar to FIG. 15, but showing how a ferrite core in the magnetic field surrounding the conductor can be employed for frequency modulating a radio transmitter.

Referring now particularly to FIG. 1 of the drawings, it will be observed that the reference character 10 designates, generally, an alternating current electric power system which may operate at a frequency of 60 cycles per second and at a voltage ranging from 14.5 kv. to 500 kv. or more. This is indicated as being a frequency $f$. The electric power system 10 includes a power supply circuit represented by conductors 11—11. It will be understood that the power supply circuit 11—11 can be a single phase circuit or a polyphase circuit and that one of the conductors may be grounded in accordance with conventional practice. The power supply circuit 11—11 is connected by a normally closed circuit interrupter 12 to energize a primary winding 13 of a power transformer that is indicated, generally, at 14. It will be understood that the power transformer 14 is either a single phase transformer or a polyphase transformer, depending upon whether the power supply circuit is a single phase or a polyphase circuit. The power transformer 14 includes a secondary winding 15 that is connected to energize a load circuit represented by the conductors 16—16. As indicated in the drawings the load circuit 16—16 has the frequency $f$ applied thereto. Conventional trip means capable of being electrically operated are employed for controlling the opening of the circuit interrupter 12. Other equally conventional means are employed for closing the circuit interrupter 12. The trip means includes a trip winding or coil 17 that can be energized from any suitable source such as a battery 18. It will be understood that any other source available can be used and that energy for operating the trip means 17 can be derived from the load circuit 16—16, if desired. The trip circuit is completed by the closure of normally open contacts 19 as the result of movement of a bridging contact 20 into engagement therewith. Any suitable means can be employed for operating the bridging contact 20. As illustrated, a relay winding 21 can be used for this purpose. The relay operated by the winding 21 may be a polarized relay when its operation depends upon the flow of a direct current component. Otherwise, it may be operable on alternating current.

The electric power system 10 and elements associated therewith that have just been described are common to the various circuit arrangements shown in several of the figures of the drawings. It will be understood that they are conventional and that various modifications thereof can be made. Since the same elements are employed in the other figures of the drawings, the same reference characters are applied thereto and the description thereof will not be repeated.

It is desirable that the relay winding 21 be energized under certain operating conditions of the electric power system 10. For example, in the event that the current flowing in the system exceeds a predetermined value or in the event of a short circuit, it is desirable that the relay winding 21 be energized for moving the bridging contact 20 into engagement with the contacts 19 to energize the trip coil 17 and permit the circuit interrupter 12 to open and disconnect the power supply circuit 11—11 from the power transformer 14 and the load circuit 16—16.

In accordance with this invention means are provided for measuring the current flow in one of the conductors forming the power supply circuit 11—11. It will be noted that a magnetic core 24 has one of the conductors 11 extending therethrough so that it functions as a current transformer having a single turn primary winding. In this particular embodiment of the invention secondary windings 25 and 26 are provided on the magnetic core 24 and voltages are induced therein, as will be readily understood, which correspond to the magnitude of the current flowing in the power supply circuit 11—11. The secondary winding 25 is connected to energize a bridge type rectifier, shown generally at 27, the double frequency output of which is applied through a blocking capacitor 31 to a primary winding 32p of a transformer 32 having a secondary winding 32s. Other frequency multipliers can be used.

Now it will be observed that the other secondary winding 26 on the core 24 is connected in series with the secondary winding 32s and that the frequency output of this winding is the same as the frequency of the power supply circuit 11—11 or 60 cycles. This is indicated at $f$ with the result that the frequencies $f$ and $2f$ are connected in series and applied through a non-linear impedance device 30 across the relay winding 21. As described in more detail in my U.S. Patent No. 3,005,134, issued October 17, 1961, when a fundamental and a second harmonic thereof are applied to a non-linear impedance device, such as a non-linear resistor 30, the current flow therethrough includes a direct current component the magnitude of which is a function of the magnitude of the fundamental and second harmonic. Advantage is taken of this effect to energize the relay winding 21 upon the occurrence of the predetermined overload or short circuit conditions in the electric power system 10 with the result that the normally open contacts 19 are closed by the bridging contact 20 to energize the trip coil 17 and cause the circuit interrupter 12 to open and deenergize the power transformer 14 and the load circuit 16—16.

Under certain circumstances it may be desirable to employ only the second harmonic or the frequency $2f$ for energizing the relay winding 21 to trip the circuit interrupter 12. One reason for using the higher frequency is to increase the speed of response of the trip means and energization of the trip coil 17 to a time less than a half cycle of the fundamental frequency $f$. Since the second harmonic or a higher harmonic is employed for this purpose and since this frequency is correspondingly higher than the fundamental frequency $f$, there is a corresponding decrease in the time of response.

In the system shown in FIG. 1 when both the fundamental frequency $f$ and its second harmonic $2f$ are employed in the manner described, it will be understood that they are in phase as indicated in the diagram. Under certain operating conditions, described hereinafter, it is desirable to operate the system with $f$ and $2f$ out of phase through a predetermined extent.

In the system illustrated in FIG. 1 the magnetic core is in relatively close proximity to one of the conductors of the power supply circuit 11—11. Depending upon the voltage of the power supply circuit 11—11, appropriate precautions must be taken from an insulation standpoint. Ordinarily the trip coil 17 and associated parts operate at ground potential. Thus suitable precautions are required to be taken in order to avoid a failure of insulation. When the power supply circuit 11—11 operates at a relatively high voltage, such as at a voltage of 115 kv. or higher, it is impractical to use the direct connected system illustrated in FIG. 1.

In order to take advantage of the insulation of the power supply circuit 11—11 and to avoid the necessity for providing a direct connection between the control means directly associated with the power supply circuit 11—11 and the trip means for the circuit interrupter 12, provision can be made for using a radio link generally as described in my U.S. Patent No. 2,724,821, issued November 22, 1955.

FIG. 2 shows such a system in which provision is made for controlling the energization of the relay winding 21 through a radio link which is provided by a radio transmitter that is indicated, generally, at 33 and includes the various circuit elements enclosed in the broken line outline. The output of the bridge type rectifier 27 is partially filtered by a capacitor 28 to provide a 120 cycle or $2f$ output which is used as a modulating frequency for the radio transmitter 33. When the current flow through the power supply circuit 11—11 attains a predetermined value, sufficient voltage is generated in secondary winding 25 to cause a zener diode 29 to break down and become conducting with the result that current flows through a resistor 34. A potential appears across the terminals of the resistor 34 for energizing a transistor 35 and its circuit the frequency of which is controlled by a quartz crystal 36. The quartz crystal 36 may be selected to operate the radio transmitter 33 at any desired frequency. For example, it may be chosen to operate at a frequency of the order of 27.2 megacycles, this being in the band of frequencies that it is permissible to use for applications such as disclosed herein. The frequency of the radio transmitter 33 also is controlled by an inductor 37 and capacitors 38 and 39 to the end that a signal is radiated by the antenna 40. It will be understood that the carrier frequency of the quartz crystal 36 and associated control circuits is modulated not only by the frequency $2f$ but also by the frequency $f$ to the end that both frequencies are transmitted from the antenna 40. The magnitude of the modulation, of course, is determined by the current flow in the power supply circuit 11—11.

It will be understood that the radio transmitter 33 is relatively small in size, is powered through the magnetic core 24 and can be constructed so as to form a unitary structure therewith that can be mounted readily on one of the conductors of the power supply circuit 11—11. Thus, advantage is taken of the insulation of the power supply circuit 11—11 and it is unnecessary to take any particular precautions with respect to the insulation of the link between the radio transmitter 33 and the trip coil 17 which can be located at ground potential.

Cooperating with the radio transmitter 33 is a radio receiver 42 of conventional construction that is tuned to the frequency of the transmitter 33 which is indicated as frequency A. The radio receiver 42 has an antenna 43 to receive the signal that is radiated from the antenna 40 of the radio transmitter 33. The output of the radio receiver 42, which is in the form of the fundamental frequency and its second harmonic is applied, as described hereinbefore, to non-linear impedance device 30 in the form of a non-linear resistor so that the direct current component of the current flowing therethrough varies as a function of the magnitude of the fundamental frequency $f$ and its second harmonic $2f$. When this is sufficient, the relay winding 21 is energized to move the bridging contact 20 into engagement with the normally open contacts 19 for completing the energizing circuit for the trip coil 17 to the end that the circuit interrupter 12 is opened. If desired, a polarized relay can be employed for operation by the relay winding 21 in lieu of the conventional relay construction shown.

It will be understood that the radio transmitter 33, instead of being modulated by the fundamental frequency $f$ and its second harmonic, can by suitable frequency multipliers have its carrier frequency modulated by a fundamental or 120 cycle frequency and its second harmonic $4f$ or 240 cycles. Also it will be understood that the fundamental frenquency $f$ can be omitted and the radio transmitter 33 modulated only with a higher frequency such as $2f$, $3f$, $4f$, etc., and that this frequency alone can be employed for energizing the relay 21 without requiring the use of the non-linear impedance device or non-linear resistor 30. The reason for using the high frequency is to increase the speed of response upon the occurrence of a fault in the electric power system 10.

Referring now particularly to FIG. 3 of the drawings, it will be observed that the arrangement there shown is similar to that illustrated in FIG. 1 and described hereinbefore. Instead of employing the relay winding 21 for operating the bridging contact 20, the latter is mounted for movement with a shaft 48, that is indicated by a broken line, extending from a permanent magnet rotor 49 that forms a part of a non-linear impedance device of the magnetic type that is illustrated, generally, at 50. It includes a saturable magnetic core 51 provided with windings 52 and 53. In my U.S. Patent No. 3,007,042, issued October 31, 1961, there is provided a description of the manner in which a non-linear impedance device of the type illustrated at 50 operates. It will be noted that the winding 52 is connected for energization across the resistor 34 so that the second harmonic frequency or $2f$ is applied thereto from the bridge type rectifier 27. The other winding 53 is energized with the fundamental frequency $f$ that is obtained from a secondary winding 54 that forms a part of a transformer, shown generally at 55, having a primary winding 56 that is connected for energization across the load circuit 16—16.

It will be understod that the fundamental frequency $f$, applied to the winding 53 and the second harmonic $2f$ thereof, applied to the winding 52 are in phase and that when the current flow in the power supply circuit 11—11 exceeds a predetermined value, the zener diode 29 becomes conducting. Sufficient currents then flow through the windings 52 and 53 to rotate the permanent magnet rotor 49 against the tension of the spring 46 which is adjusted by adjusting nut 47 to close normally open contacts 19 and complete an energizing circuit from the battery 18 to the trip coil 17 for tripping the circuit interrupter 12. The current flowing in the winding 52 always varies as a function of the current flow in the power supply circuit 11—11. When this current flow exceeds a predetermined value as determined by the tension of the spring 46, the contacts 19 are bridged by the bridging contact 20 to trip the circuit interrupter 12 in the manner described.

FIG. 4 shows a differential protection system for the electric power system 10. To a considerable extent the circuit elements illustrated in FIG. 1 are employed here. It will be understood that provision is made for effecting the opening of the circuit interrupter 12 in the event that there is a predetermined difference in the currents flowing in the power supply circuits 11—11 and the load circuits 16—16. It is usually the case that this difference in current flow involves a greater flow of current to the primary winding 13 than flows from the secondary winding 15 of the power transformer 14. The usual reason for this is that one or more turns of one of these windings become short circuited. As a result of this condition there is a shift in phase of the current flow in the load circuit 16—16 with respect to the flow of current in the power supply circuit 11—11. Advantage is taken of this difference in phase shift to detect the fault condition and provide for tripping the circuit interrupter 12.

Referring now particularly to FIG. 4, it will be observed that the second harmonic frequency 2f is supplied from the bridge type rectifier 27 through a capacitor 59 and across direct current terminals 60 and 61 of the non-linear impedance device of the bridge type that is illustrated, generally, at 62. In my U.S. Patent No. 3,007,042, issued October 31, 1961, there is included a description of the operation of a non-linear impedance device of the bridge type. For present purposes it is pointed out that it includes two adjacent arms with the terminal 60 between non-linear resistors 63—63 while the other two arms comprise linear resistors 64—64 with the terminal 61 therebetween. The other terminals 65 and 66 have applied thereto the fundamental frequency f from a secondary winding 67 that is located on a magnetic core 68 through which one of the load circuit conductors 16—16 extends and functions therewith as a single turn primary winding. A phase shifter 69 is interposed between the bridge type rectifier 27 and the non-linear impedance device 62 and it is adjusted to the end that the second harmonic 2f is normally 90° out of phase with the fundamental frequency f when the electric power system 10 is functioning normally. Under these conditions no direct current potential appears between the direct current terminals 60 and 61 so that the relay winding 21 connected thereacross is not energized with direct current. The alternating current flowing between terminals 60 and 61 is insufficient to effect movement of the bridging contact 20 to the position where the normally open contacts 19 are bridged.

Assuming now that a fault develops in the power transformer 14 involving one or more short circuited turns of the primary winding 13 or of the secondary winding 15, then there will be a shift in the phase of the current flow in the secondary winding 15 and in the load circuit 16—16 with respect to the phase of the current flow in the primary winding 13 and power supply circuit 11—11. This phase shift will be reflected in a shift in the phase of the frequency f with respect to the phase of the frequency 2f. As described in my U.S. Patent No. 3,007,042, issued October 31, 1961, this phase shift from a condition where the fundamental frequency f is normally 90° out of phase with its second harmonic 2f, causes a flow of a direct current component between the terminals 60 and 61 the magnitude of which is a function of the degree of phase shift with a maximum change taking place as the phase is shifted from the 90° position. Accordingly, under these conditions sufficient current flows through the relay winding 21 having a direct current component capable of operating the bridging contact 20 to the closed position with the result that the normally open contacts 19 are bridged, trip coil 17 is energized and the circuit interrupter 12 is tripped.

In FIG. 5 of the drawings there is shown a modification of the differential protective system shown in FIG. 4 and previously described. In FIG. 5 a portion of the arrangement illustrated in FIG. 2 is employed. It will be observed that the radio transmitter 33 is associated with the power supply circuit 11—11 and that it cooperates with receiver 42, both operating on a carrier frequency A that is modulated by the fundamental frequency f and its second harmonic 2f. It will be noted that the transmitter 33 is provided with a directional antenna 72 that is beamed toward a directional antenna 73 on the receiver 42 along a path 74 which has a limited transverse dimension in order to avoid interference with the other radio transmitting and receiving apparatus. The output of the receiver 42, comprising the fundamental f and its second harmonic 2f in phase, is applied to a non-linear resistor 75 in series with a winding 76 that forms a part of a balance relay 77. The winding 76 cooperates with an armature 78 at one end of a beam 79 that is fulcrumed at 80. The beam 79 carries the bridging contact 20 which is associated with two sets of normally open contacts 19—19 that are connected in parallel so that regardless of the direction in which the beam 79 rocks, one or the other of the sets of contacts 19—19 will be closed to complete the energizing circuit for the trip coil 17. At the other end of the beam 79 is an armature 81 with which a winding 82 cooperates. The winding 82 is energized from the load circuit 16—16 by a radio transmitter 83 operating on a carrier frequency B. Otherwise the transmitter 83 corresponds to the transmitter 33 previously described. A receiver 84 is arranged to be tuned to the frequency B. A directional antenna 85 is provided for the transmitter 83 and a similar directional antenna 86 is provided for the receiver 84 so that the transmission is along a path 87 between the transmitter 83 and receiver 84. The output of the receiver 84 comprising the fundamental frequency and its second harmonic 2f in phase is applied through a non-linear resistor 88 in series with the winding 82.

Under normal operating conditions for the arrangement shown in FIG. 5, with balanced conditions existing with respect to the power supply circuit 11—11 and the load circuit 16—16, the current flows through the windings 76 and 82 of the balance relay 77 are equal and the bridging contact 20 is held out of contact engagement with either of the sets of normally open contacts 19—19. However, should this balanced condition in the power supply circuit 11—11 with respect to the load circuit 16—16 be upset, then the current flow in one or the other of the windings 76 or 82 will exceed that in the other and the beam 79 will be rocked to close one or the other of the sets of contacts 19—19. Since they are connected in parallel, the trip coil 17 will be energized and the circuit interrupter 12 will be tripped.

If desired, a second circuit interrupter 12 can be provided in the load circuit 16—16 with trip means operating in parallel with the trip coil 17 to the end that the power transformer 14 is disconnected from both the power supply circuit 11—11 and the load circuit 16—16 upon the occurrence of fault conditions resulting from unbalanced current conditions in the power supply circuit 11—11 and the load circuit 16—16.

FIG. 6 shows an over current responsive system which combines certain of the features illustrated in FIGS. 2, 3 and 4 and described hereinbefore. Here the radio transmitter 33 is modulated by the second harmonic 2f derived from the power supply circuit 11—11. This second harmonic 2f demodulated from the receiver 42 is applied through the capacitor 59 to the bridge type non-linear impedance device 62. The fundamental frequency f is obtained from the secondary winding 54 of the transformer 55 whose primary winding 56 is connected for energization across the load circuit 16—16. Upon the occurrence of predetermined flow of current in the power supply circuit 11—11, a corresponding flow of second harmonic 2f takes place and resulting voltage is applied across the direct current terminals 60 and 61 of the bridge type non-linear impedance device 62 with the result that sufficient current including a direct current component goes through the relay winding 21 to cause the bridging contact 20 to bridge the normally open contact 19 and energize the trip coil 17. As a result the circuit interrupter 12 is tripped.

Instead of modulating the transmitter 33 with the second harmonic 2f, it can be modulated with a higher harmonic in a manner to be described hereinafter. In addition the second harmonic 2f or a higher harmonic can be employed by itself for operating the relay winding 21 under predetermined overload conditions. In such case the relay winding 21 becomes a current measuring device arranged to exert sufficient magnetic force on the bridging contact 20 under predetermined operating conditions corresponding to predetermined current flow in the power supply circuit 11—11 to bridge the contacts 19 and energize the trip coil 17.

In FIG. 7 there is shown a modification of the receiving circuit which can be employed in lieu of that shown in FIG. 6. Here a frequency quadrupler 91 is interposed between the source of frequency $f$ and the bridge type non-linear impedance device 62. Accordingly, a frequency of $4f$ is applied across the terminals 65 and 66 which now become the direct current terminals and accordingly the capacitor 59 is interposed in this circuit. Also the relay winding 21 is connected across the terminals 65 and 66 as indicated. One reason for employing the frequency quadrupler 91 in combination with the second harmonic derived from the power supply circuit 11—11 is to avoid with more certainty any influence of extraneous conditions that might be effective to cause a false operation of the trip coil 17.

FIG. 8 shows how the over current responsive system illustrated in FIG. 2 can be applied to a polyphase system. Here it will be observed that the circuit interrupter 12 is a polyphase circuit interrupter and that it is arranged to interconnect the polyphase power supply circuit 11—11—11 to the primary windings 13—13—13 of a polyphase power transformer 14 having secondary windings 15—15—15 for energizing a load circuit 16—16—16. Associated with each of the power supply conductors 11 is a transmitter 33. It will be noted that each of the three transmitters 33 is arranged to operate respectively at frequencies A–B–C and that the three associated receivers 42—42—42 are arranged to be tuned to these frequencies A–B–C respectively. The directional antennas 72 and 73 are employed and the paths 74—74—74 therebetween are sufficiently separated so that there is no interference. The trip coil 17 is arranged to be operated on closure of any of the normally open contacts 19—19—19, as will be readily understood, resulting from the occurence of a fault individual to any one of the phases or power supply circuits 11—11—11.

FIG. 9 shows an arrangement for providing simultaneously over current and differential protection for the electric power system 10. It will be observed that certain features of the arrangement shown in FIGS. 1 and 4 are here employed to provide for such protection.

In the arrangement shown in FIG. 9 the second harmonic $2f$ is obtained by means of a magnetic frequency doubler that is indicated, generaly at 92. It includes a magnetic core 93 which is similar, for example, to the magnetic core 24 and is associated with one of the conductors of the power supply circuit 11—11 so that this conductor functions as a single turn primary winding. The magnetic core 93 may be partially open, as shown, or completely closed as desired and it has a window 94 to receive the conductor 11. The magnetic core 93 is provided with an E-shaped section that is indicated, generally, at 95. The common portion 96 of the E-shape section 95 is arranged to be saturated with alternating flux on flow of predetermined alternating current in the associated conductor 11. The E-shape section has a central leg 97 opposite which there is positioned a permanent magnet 98. If desired, a magnetic shunt 99 can be provided for interconnecting the permanent magnet 98 to the outer legs of the E-shaped section 96 with air gaps 100—100 therebetween. A secondary winding 101 is mounted on the central leg 97 and it corresponds to the secondary winding 25 described hereinbefore except that, because of the provision of the E-shaped section 96 on the magnetic core 95 with the saturable portion 96 in combination with the permanent magnet 98 a frequency $2f$ which is double that of the frequency $f$ of the power supply circuit 11—11 is induced therein. This construction facilitates the use of the magnetic frequency doubler 92 with a single turn primary winding which extends through the window 94.

It will be observed in FIG. 9 that the second harmonic $2f$ is combined through two bridge type non-linear impedance devices 62—62 with the fundamental frequency $f$ obtained from the secondary winding 67 on the magnetic core 68 which is associated with the load circuit 16—16.

For over current protection the second harmonic $2f$ is applied through the capacitor 59 to the bridge type non-linear impedance device 62 shown at the left side of the circuit in FIG. 9 and a zener diode 29 is provided for preventing the energization of the associated relay winding 21 until a predetermined over current exists. When this occurs, the normally open contacts 19 are bridged by the bridging contact 20 and the trip coil 17 is energized to trip the circuit interrupter 12 in the manner previously described.

In order to provide the differential protection the second harmonic induced in the secondary winding 101 is caused to energize the other bridge type non-linear impedance device 62 through the phase shifter 69 which is adjusted, as described previously, so that the second harmonic $2f$ is 90° out of phase with the fundamental frequency $f$ under normal operating conditions. Upon the occurrence of a short circuited turn in one of the windings 13 or 15 of the power transformer 14, the phase relationship between the current flowing in the load circuit 16—16 is changed with respect to that of the current flowing in the power supply circuit 11—11. Accordingly, a direct potential appears between the terminals 60 and 61 of the bridge type non-linear impedance device 62 associated with the phase shifter 69 and, as a result, the associated relay winding 21 is energized to move bridging contact 20 into engagement with the normally open contacts 19 associated therewith to energize the trip coil 17 and open the circuit interrupter 12.

FIG. 10 shows how the arrangement illustrated in FIG. 9 can be practiced using the radio transmitter 33 and radio receiver 42 associated with the power supply circuit 11—11. Also FIG. 10 shows the transmitter 83 associated with receiver 84. In this arrangement the carrier frequency B at which the transmitter 83 operates is modulated with the second harmonic $2f$ which is obtained from the load circuit 16—16. The magnetic frequency doubler 92 is employed in conjunction with the bridge type rectifier 27 to quadruple the frequency derived from the power supply circuit 11—11 and the transmitter frequency A of the transmitter 33, accordingly, is modulated with the frequency $4f$. The fundamental frequency $2f$ and second harmonic $4f$ are combined in the two non-linear impedance devices 62—62, as described in FIG. 9, to provide simultaneously the over current protection and the differential protection. It will be understood that the transmitter frequency A of the transmitter 33 can be modulated with the frequency $f$, if desired.

Referring now particularly to FIG. 11 of the drawings, it will be observed that provision is made for tripping the circuit interrupter 12 through the transmission of energy in the form of sound waves from a location adjacent the high voltage power supply circuit 11—11 to the means at ground potential that is used for controlling the energization of the trip coil 17. It will be observed that the secondary winding 25 on the magnetic core 24 is arranged to energize series connected primary windings 103 and 104 of frequency triplers shown, generally, at 105 and 106. They are provided with series connected secondary windings 107 and 108 that are connected across a capacitor 109 with the secondary circuit and the capacitor 109 being tuned to resonance at the triple frequency or $3f$, i.e., 180 cycles, provided that the frequency of the power supply circuit 11—11 is 60 cycles. A portion of the energy at the triple frequency is applied across one set of terminals of a bridge type rectifier 110 the other terminals of which are connected through a capacitor 111 to a primary winding 112 of a transformer 113. The arrangement is such that the frequency 3f is doubled and a frequency 6f is applied to the primary winding 112 and it is induced into a secondary winding 114 that is connected in series with a winding 115 of a loud speaker 116 and also in series with that portion of the circuit that provides the tripled frequency 3f. Thus sound waves having frequencies of 3f and 6f are superimposed and are in phase and emitted from the loud speaker 116 in the form of sound waves indicated by the broken lines 117. These sound waves comprising the superimposed frequencies 3f and 6f are directed along a beam or a path of small transverse dimension to impinge upon a receiver or microphone 118 that has its winding 119 connected to an amplifier 120 preferably of the push-pull type. The output of the amplifier 120 is connected through a zener diode 121 and a non-linear impedance device 122 in the form of a non-linear resistor to energize the relay winding 21.

It will be understood that the magnitude of the sound waves 3f and 6f varies in accordance with the magnitude of the current flow in the power supply circuit 11—11. When this current flow reaches a predetermined value such as a predetermined over current or a short circuit, the magnitude of the sound waves 3f and 6f is correspondingly increased and they appear in the output of the amplifier 120 to provide a sufficient voltage to render the zener diode 121 conducting. The combination of the frequencies 3f and 6f in phase applied to the non-linear impedance device 122 is capable, as described hereinbefore, of providing a sufficient current flow to energize the relay winding 21 and cause the bridging contact 20 to bridge normally open contacts 19 thereby completing the energizing circuit for the trip coil 17 and opening the circuit interrupter 12.

An important reason for employing the combination of sound waves made up of frequencies 3f and 6f is to avoid the likelihood that an extraneous sound of sufficient magnitude would be applied to the receiver or microphone 118 which might accidentally cause the energization of the relay winding 21. Since it is extremely unlikely that extraneous sound having frequencies of 3f and 6f in exact phase relationship would be applied to the receiver or microphone 118, it will be apparent that there is little likelihood of a false operation of the circuit interrupter 12 due to an extraneous sound.

The arrangement shown in FIG. 12 employs certain of the elements utilized in FIG. 11. In the arrangement shown in FIG. 12 the fundamental frequency 3f and its second harmonic 6f are out of phase at minimum current flow in the power supply circuit 11—11. Provision is made for shifting the phase of the fundamental frequency 3f with respect to the second harmonic as a function of the current flow in the power supply circuit 11—11. For this purpose a second set of series connected primary windings 125 and 126 are provided on frequency triplers 127 and 128 which have series connected secondary windings 129 and 130 that are connected across a capacitor 131. The secondary windings 129 and 130 together with the capacitor 131 are tuned to resonance at the fundamental frequency 3f the same as the secondary windings 107 and 108 and the capacitor 109 previously described. As before, the fundamental 3f is doubled using the bridge type rectifier 110 so that the second harmonic or 6f is applied to the primary winding 112 and induced in the secondary winding 114 in series with the fundamental frequency 3f, the combination being applied to the winding 115 of the loud speaker 116.

In order to shift the phase of the fundamental frequency 3f with respect to its second harmonic 6f a winding 132 is provided in series with the source of fundamental frequency 3f. The winding 132 forms a part of a saturable core reactor, shown generally at 133, having a primary winding 134 that is arranged to be energized with direct current from a bridge type rectifier shown, generally, at 135. The rectifier 135 is energized from a secondary winding 135 on a core 137 that is associated with one of the conductors of the power supply circuit 11—11. A capacitor 138 shunts the rectifier 135. The arrangement is such that the direct current flowing in the saturating winding 134 is directly proportional to the magnitude of the current flowing in the power supply circuit 11—11. Accordingly, the degree of saturation of the saturable reactor 133 is controlled in accordance with the flow of current in the power supply circuit 11—11. As a result the phase of the fundamental frequency 3f is shifted with respect to the phase of its second harmonic 6f.

The sound waves indicated at 117 from the loud speaker 116 are received by the receiver or microphone 118 and amplified by the amplifier 120 the output of which is applied to the non-linear impedance device 122. Under conditions of current flow in the power supply circuit 11—11 below a predetermined value the corresponding minimum value of direct current flows through the saturating winding 134 and the sound waves comprising the fundamental 3f and its second harmonic 6f are out of phase. Accordingly, a minimum direct current flows in the non-linear impedance device 122. Now when the flow of current in the power supply circuit 11—11 increases there is a corresponding increase in the flow of direct current in the saturable core reactor winding 134 with the result that the fundamental frequency 3f approaches an in phase relation with respect to the second harmonic 6f thereof. There is a corresponding increase in the direct current flow through the non-linear impedance device 122 with the result that the relay winding 21 is energized to move the bridging contact 20 into bridging contact engagement with the normally open contacts 19. This causes energization of the trip coil 17 and the circuit interrupter 12 to open.

FIG. 13 shows an arrangement for protecting the electric power system 10 against an over load which involves the modulation of a supersonic frequency with a fundamental frequency and its second harmonic. Here it will be observed that the bridge type rectifier 110 is shunted by a capacitor 140. This filter arrangement leaves a 120 cycle ripple or a frequency of 2f which is applied to a supersonic frequency generator that is indicated, generally, at 141 and may be arranged to operate at a frequency of 20,000 cycles. It will be understood that other supersonic frequencies can be used. The supersonic frequency generator 141 includes an audio transformer, shown generally at 142, having windings 143 and 144 inductively related and connected across the terminals of the bridge type rectifier 110 so that the necessary direct potential is applied thereto as well as 120 cycle ripple or frequency 2f. The other terminals of the windings 143 and 144 are connected, respectively, to an emitter 145 and a collector 146 of a transistor that is shown, generally, at 147 and includes a base 148 which is connected through a capacitor 149 to the negative terminal of the rectifier 110. The audio transformer 142 also includes a pick-up coil 150 inductively related to the windings 143 and 144 with the result that the fundamental frequency 2f is induced therein and is applied to the winding 115 of the loud speaker 116 along with its second harmonic which also modulates the supersonic frequency generator 141.

The second harmonic frequency 4f is obtained through the use of the magnetic frequency doubler 94 previously described. It has a primary winding 151 which is connected to the secondary winding 26 on the core 24. For the reason described hereinbefore the secondary winding 101 has a frequency 2f induced therein which is applied to opposite terminals of a bridge type rectifier 152 that supplies a double frequency ripple or a frequency of 4f in this particular case. It will be understood that the combination of the fundamental frequency 2f and its second harmonic 4f modulate the frequency of the supersonic frequency generator 141 and that the composite wave form is applied to the winding 115 of the loud speaker 116 for conversion into sound waves as indicated at 117 to be received by the receiver or microphone 118. The output of the amplifier 120, which is connected to the output winding 119 of the receiver or microphone 118, is applied across a non-linear impedance device 122 and direct current flows therethrough corresponding to the magnitude of the fundamental frequency $2f$ and its second harmonic $4f$. The direct current voltage drop across the non-linear impedance device 122 charges a capacitor 153 to a predetermined potential which is a function of the current flow in the power supply circuit 11—11. When this current flow exceeds a predetermined value, the zener diode 121 is rendered conducting and the capacitor 153 discharges to energize relay winding 21 thereby causing bridging contact 20 to bridge normally open contacts 19 and energize trip coil 17 to effect opening of the circuit interrupter 12.

Any of the arrangements shown in FIGS. 11, 12 and 13 can be employed for use with a polyphase circuit such as that illustrated in FIG. 8. Individual receiving circuits can be provided for each of the phases. Alternatively, a single receiver arrangement can be used that is common to the three loud speakers 116 thereby requiring that only a single relay winding 21 be employed for effecting the energization of the trip coil 17 rather than three such relay windings 21, otherwise required if receiving apparatus individual to each phase is used. Where a single receiving circuit is employed in combination with a plurality of loud speakers 116, the latter are arranged to focus on the single receiver or microphone 118.

In employing any of the circuit arrangements described hereinbefore, it is highly advantageous to use the combination of a fundamental frequency $f$ and its second harmonic $2f$ or multiples thereof as described. One reason for this is that it is extremely unlikely that a transient condition appearing in the electric power system 10 will produce a control signal comprising a fundamental frequency and its second harmonic in the exact phase relationship required for operation of the receiving apparatus. This makes it extremely unlikely that an extraneous signal would ever cause a false operation of the circuit interrupter 12.

While it has been pointed out that frequency $f$ and its second harmonic $2f$ are used for effecting remote control functions and also that harmonics of these frequencies can be used, attention is directed to the fact that frequencies such as $2f$ and $3f$ can be transmitted or used for modulation. At the receiving station the frequency $2f$ is tripled to provide $6f$ which can be used as the second harmonic of $2f$.

In certain instances it is desirable to transmit $f$ and $2f$ or their harmonics in 90° phase relation rather than in phase. At the receiving station they are restored to in phase relation for use as described. Also $f$ and $2f$ or their harmonics can be transmitted in other angular phase relations with suitable receiving circuits. One reason for using these out of phase relationships is that they reduce the likelihood of false operation resulting from accidental receipt of the control frequencies which may occur when the in phase relation is used. Another reason is to segregate the signals from one phase or circuit from those of another phase or circuit.

At the receiving station further precautions can be taken to segregate the signals. The output of the receiver can be tuned to resonance at the frequencies $f$ and $2f$ or either of them or their harmonics to the end that only these frequencies transmitted from the transmitter individual thereto are effective to perform the intended control function. This can be accomplished by use of tuned LC circuits, vibrating reed relays or magnetostriction devices.

Referring now particularly to FIG. 14 of the drawings, it will be observed that the reference characters 160—160—160 represent line conductors of a polyphase high voltage alternating current power transmission line. They may be energized at any usual voltage for transmitting alternating current power ranging upwardly from 14.5 kv. and operating, for example, at higher voltages such as 500 kv. or more. The conductors 160—160—160 correspond to phases X–Y–Z and associated with each is a radio transmitter that is indicated at 161, there being three radio transmitters 161—161—161, each arranged to operate at a different frequency in order to avoid interference. At a remote point and tuned to the several radio transmitters 161—161—161 are radio receivers 162—162—162 which, as indicated, are associated with the respective phases X–Y–Z. They are provided with antennas 163—163—163.

As will appear hereinafter the radio transmitters 161—161—161 are arranged to transmit indications corresponding to the voltage of and the current flow through the line conductors 160—160—160. The radio receivers 162—162—162 are arranged individually to receive these indications. For illustrative purposes the receiver 162 associated with phase X is shown as being arranged to operate an ammeter 164 for indicating the current flow in the line conductor 160 associated therewith.

The other two radio receivers 162—162 associated with phases Y and Z have non-linear resistors 165 connected across their output terminals. For phase Y a wattmeter 166 is connected across the non-linear resistor 165 and is arranged to indicate watts. For phase Z a power factor meter 167 is connected across the non-linear resistor 165 and it is arranged to indicate leading or lagging power factor.

FIG. 15 shows certain details of construction of one of the radio transmitters 161 as shown in FIG. 14. It is desirable to measure not only the magnitude of the current flowing through the conductor 160 but also it is desirable to measure the voltage of the conductor 160 with respect to ground or to an adjacent conductor 160. One of the reasons for obtaining a voltage measurement is to arrange to combine it with the current measurement for indicating the power flow and also for indicating power factor. Another reason for obtaining a measurement of voltage is to be able to operate the radio transmitter 161 to send a continuous carrier frequency regardless of the magnitude of current flow through the conductor 160 and to cause the transmitter to continue to operate even though no current flows through the conductor 160.

With a view to providing a measurement of the voltage of the conductor 160 a metallic cylinder 170 of brass, aluminum or other like metal having relatively high conductivity, is located with the conductor 160 extending along its axis and insulated therefrom by insulator discs 171—171. Preferably the insulator discs 171—171 are sealed to the ends of the metallic cylinder 170 in order to provide a weather tight construction for the equipment that is located inside of it. It will be understood that the metallic cylinder 170 is located in the electric field around the insulator 160 and that a voltage exists between it and the conductor 160 when the latter is energized regardless of the current flow through the conductor 160.

Located within the metallic cylinder 170 is a transmitter circuit 172 that is generally the same as the circuit employed in the radio transmitter 33 and shown in FIG. 2. For energizing the transmitter circuit 172 a bridge type rectifier 173 is employed and it is connected for energization across a secondary winding 174 of a transformer, shown generally at 175, which has a primary winding 176 that is connected in series circuit relation with a non-linear resistor 177, such as a thyrite resistor or a gas tube, with the combination being connected between the conductor 160 and the metallic cylinder 170.

It is particularly desirable at the lower voltages, i.e., voltages of the order of 14.5 kv. to 69 kv., to employ the non-linear resistor 177 in series with the primary winding 176. While the current flow through the non-linear resistor 177 has the frequency of the conductor 160, it also contains harmonics of the line frequency and other oscillations and "noise" frequencies. This results in a larger charging current through the primary winding 176 than would be obtained if it were connected directly between the conductor 160 and the metallic cylinder 170. For voltages above 69 kv. the importance of the use of the non-linear resistor 177 becomes less because of the greater intensity of the electric field.

It will be observed that a filter capacitor 178 is connected across the output terminals of the bridge type rectifier 173. If it is desired that the transmitter circuit 172 be modulated only as a function of the current flow through the conductor 160, then the filter capacitor 178 is of such size as to eliminate all of the second harmonic of the line frequency that appears between the output terminals of the rectifier 173. When it is desired to modulate the transmitter circuit 172 with the second harmonic of the line frequency the magnitude and phase position of which correspond to the magnitude and phase position of the voltage of the conductor 160, a lesser capacitance for the filter capacitor 178 is employed to permit some of the double frequency to modulate the carrier frequency generated by the transmitter circuit 172.

The transmitter circuit 172 includes a quartz crystal 179 that determines the frequency of the carrier that is generated by the transmitter circuit 172. It will be understood that different quartz crystals 179 are employed for the transmitters associated with the other two phases. Associated with the quartz crystal 179 is a transistor 180 having a base 180b, a collector 180c and an emitter 180e. Associated with the transistor 180 are a capacitor 181, an inductor 182 and a capacitor 183. Their values are such as to correspond to the frequency of the quartz crystal 179. An antenna coupling capacitor 184 interconnects the circuit associated with the collector 180c to the metallic cylinder 170 which functions as the antenna for the transmitter circuit 172.

In order to provide for modulating the output of the transmitter circuit 172 as a function of the current flow through the conductor 160, a Hall plate 185 is positioned in the magnetic field surrounding the conductor 160. It will be understood that the magnitude of this magnetic field is a function of the magnitude of the current flow in the conductor 160. The Hall plate 185 has ends 186 and 187 with the former being connected through a radio frequency choke coil 188 to the common connection between the capacitors 181 and 183 and the conductor 182. The other end 187 of the Hall plate 185 is connected through an adjustable resistor 189 to the negative output terminal of the bridge type rectifier 173. The sides of the Hall plate 185 are indicated at 190 and 191. In this embodiment of the invention the side 191 is connected through a base bias resistor 192 to the base 180b of the transistor 180.

It will be noted that the Hall plate 185 is connected in series with the direct current supply from the bridge type rectifier 173 and that, as pointed out, it is located in the magnetic field of the conductor 160 with the result that an alternating potential proportional to the magnitude of the current flow in the conductor 160 is applied to the base 180b of the transistor 180. This modulates the radio frequency or carrier output of the transmitter circuit 172 with a 60 cycle signal the magnitude of which is directly proportional to the magnitude of the current flow in the conductor 160. The alternating potential from the Hall plate 185 is taken from the one side 191 and is applied to the base 180b of the transistor 180 through the base bias resistor 192 in the manner described. The use of the Hall plate 185 is advantageous in view of the fact its output is substantially linear over a wide range of field strength for the magnetic field generated by currernt flow through the conductor 160.

When the value of the filter capacitor 178 is such as to permit some modulation of the frequency of the transmitter circuit 172 by it, then the carrier frequency is modulated not only by the 60 cycle frequency but also by double that frequency or 120 cycles and with a magnitude proportional to the voltage of the conductor 160. The combination of the two frequencies is employed for transmitting an indication of watts to be indicated by the wattmeter 166, FIG. 14, or power factor to be indicated by the power factor meter 167. If the transmitter circuit 172 is modulated solely in response to the 60 cycle frequency, then the received signal can be employed to provide an indication of amperes by the ammeter 164, FIG. 14.

It will be understood that the transmitter 161, as shown in FIG. 15, can be employed for controlling the operation of a circuit interrupter in the manner previously described herein for the transmitter 33.

FIG. 16 shows a radio transmitter 161 that is generally similar to the transmitter 161 illustrated in FIG. 15. One difference resides in the provision of a non-linear resistor 177 in the form of a gas filled tube. For illustrative purposes it is pointed out that when the voltage of the conductor 160 above ground is 7.5 kv. the non-linear resistor 177 may comprise a helium filled envelope having electrodes that are spaced six inches apart with the helium being at a pressure of one-half mm. of mercury. The non-linear resistor 177 in the form of a gas filled tube is connected in series circuit relation with the primary winding 176 of the transformer 175 and the series combination connected between the metallic cylinder 170 and the conductor 160.

In the circuit shown in FIG. 16 an inductor 195 is connected between the capacitor 178 and the collector 180c of the transistor 180. A radio frequency choke coil 196 is interposed in the circuit to the negative terminal of the bridge type rectifier 173. An additional secondary winding 197 is provided on the core of the transformer 175 for energizing a second bridge type rectifier 198 across the output terminals of which a filter capacitor 199 is connected. It will be noted that the output terminals of the bridge type rectifier 198 are connected to the ends 186 and 187 of the Hall plate 185 and that the side 190 thereof is connected through the base bias resistor 192 to the base 180b of the transistor 180. The other side 191 of the Hall plate 185 is connected to the emitter 180e.

Attention is called to the fact that the metallic cylinder 170 shown in certain of the figures of the drawings not only protects the circuitry within it from the weather but also that the circuitry is protected thereby from the effects of corona discharge from the high voltage conductor 160. In addition, as pointed out, the metallic cylinder 170 functions as a transmitting antenna for the transmitter circuit 172.

The details of construction of the radio transmitter 161, shown in FIGS. 17 and 18, are generally the same as described above. One difference resides in the provision of a coil 202 in the magnetic field surrounding the conductor 160. With this arrangement the current induced in the coil 202 is a function of the current flow through the conductor 160, the arrangement functioning as an air core transformer having a single turn primary winding. The coil 202 is connected through the base bias resistor 192 to the transmitter circuit 172 for modulating it as a function of the current flow in the conductor 160. A radio frequency choke coil 203 is interposed in the circuit to the negative terminal of the bridge type rectifier 173 for the purpose of preventing the flow thereto of the radio frequency oscillations generated by the transmitter circuit 172.

The radio transmitter 161 shown in FIGS. 17 and 18 is arranged to be applied to the conductor 160 after the latter has been installed. For this purpose slots 204—204 are formed in the insulator discs 171—171 and a lengthwise extending slot 205 is provided in the metallic cylinder 170. This arrangement facilitates the application of the radio transmitter 161 here shown to the conductor 160. A conductor 206 interconnects one terminal of the non-linear resistor 177 in the form of a gas filled tube to a terminal bolt 207 that extends through one of the insulator discs 171. A conductor 208 interconnects the terminal bolt 207 with a screw clamp 209 that can be attached to the conductor 160 by a live line tool. A radio frequency choke coil 210 is interposed between the primary winding 176 of the transformer 175 and the connection to the metallic cylinder 170.

FIG. 19 shows another arrangement for connecting the radio transmitter 161 for modulation by current flow through the conductor 160. Here provision is made for applying the voltage drop along the conductor 160 which varies as a function of the current flow therethrough for modulating the transmitter circuit 172. It will be observed that one terminal of the primary winding 176 and the negative terminal of the bridge type rectifier 173 are connected at 213 to the conductor 160. At 214, which is a point along the conductor 160 that is spaced a substantial distance from the connection at 213, the base bias resistor 192 is connected. The transmitter circuit 172 then is modulated as a function of the voltage drop between the connections 213 and 214 along the conductor 160.

In FIG. 20 the radio transmitter 161 is illustrated as employing in the transmitter circuit 172 an oscillator of the Colpitts type. Here a base bias resistor 217 is interposed between the negative terminal of the bridge type rectifier 173 and the base 180b of the transistor 180. A resistor 218 is connected to the emitter 180e to provide a bias and temperature compensation therefor. As indicated it is connected between the emitter 180e and the negative terminal of the bridge type rectifier 173. The carrier frequency is determined by the characteristics of a tuned circuit that is indicated, generally, at 219. It includes capacitors 220—220 and an inductor 221 which has a ferrite core 222 that is positioned in the magnetic field generated by current flow through the conductor 160. A radio frequency choke coil 223 is interposed between a midpoint of the conductor 221 and the positive terminal of the bridge type rectifier 173. A feed back capacitor 224 is connected in the base circuit for the transistor 180.

As pointed out the ferrite core 222 operates in the magnetic field generated by the current flow through the conductor 160. This magnetic field causes the permeability of the ferrite core 222 to change as it passes through its magnetization curve at the frequency of the current flow through the conductor 160. The permeability of the ferrite core 222 decreases twice in each cycle of the frequency of the alternating current in the conductor 160 and thus produces a frequency modulated carrier signal from the transmitter circuit 172 which is a function of the current flow through the conductor 160. The modulating frequency is twice the frequency of this current flow and the percentage modulation is a function of the magnitude of the current flow.

The various forms of the radio transmitter 161 can be employed, as pointed out in connection with FIG. 14, for providing at a remote point indications of the magnitude of different variables depending upon which of them it is desired to measure. In addition the receivers associated with the transmitters can be arranged to control the operation of relays which, in turn control the operation of circuit interrupters that are arranged to interrupt the flow of current in the conductors 160 under certain predetermined operating conditions. In the several forms of the radio transmitter 161, the carrier or transmitting frequency is always present as long as the associated conductor 160 is energized in view of the fact that the transmitting circuit in each case is energized because of the presence of the voltage of the conductor 160 and it is not dependent on the current flow through the conductor 160. Where it is desired to transmit only a signal that is a function of the current flow, the output of the bridge type rectifier 173 is filtered to remove all of the second harmonic of the line frequency. However, when it is desired to transmit a signal that, in part, is a function of the line voltage, then the filtering action is not as complete and the second harmonic is applied as a modulating frequency to the transmitter circuit 172 along with the fundamental frequency that is derived from the current flow though the line conductor 160.

What is claimed as new is:

1. In an electric power transmission system:
   (a) an alternating current power supply circuit and a load circuit,
   (b) circuit interrupter means interconnecting said circuits and trip means therefor,
   (c) non-linear impedance means,
   (d) means for deriving from said system a fundamental frequency current and a second harmonic thereof and for applying them to said non-linear impedance means to generate a unidirectional effect, and
   (e) means interconnecting said non-linear impedance means and said trip means whereby the latter is operated to open said circuit interrupter means when said unidirectional effect reaches a predetermined value corresponding to a predetermined flow of alternating current in said system.

2. The invention, as set forth in claim 1, wherein the fundamental frequency is derived from one of the circuits and the second harmonic is derived from the other circuit.

3. The invention, as set forth in claim 1, wherein the fundamental frequency and its second harmonic are derived from the power supply circuit.

4. The invention, as set forth in claim 1, wherein:
   (a) a full wave rectifier is employed for deriving the second harmonic,
   (b) means connected in series with the output of said full wave rectifier is rendered conducting on application thereto of a predetermined voltage corresponding to a predetermined current flow in the system and prevents generation of the uni-directional effect until said predetermined voltage is applied, and
   (c) the trip means is operated to open the circuit interrupter when said means connected in series with the output of said full wave rectifier becomes conducting.

5. In an electric power transmission system:
   (a) an alternating current power supply circuit and a load circuit,
   (b) circuit interrupter means interconnecting said circuits and trip means therefor,
   (c) non-linear impedance means,
   (d) means for deriving from one of said circuits a fundamental frequency current and from the other of said circuits a second harmonic thereof and applying them to said non-linear impedance means to generate a unidirectional effect the magnitude of which is a function of the magnitude of the difference in a variable characteristic of the flows of alternating currents in said circuits, and
   (e) means interconnecting said non-linear impedance means and said trip means whereby the latter is operated to open said circuit interrupter means when said unidirectional effect reaches a predetermined value corresponding to a predetermined difference in said variable characteristic of the flow of alternating currents in said circuits.

6. The invention, as set forth in claim 5, wherein:
   (a) means shift the phase of the second harmonic applied to the non-linear impedance means with respect to the phase of the fundamental frequency whereby as long as the alternating currents flowing in the circuits are in phase the unidirectional effect is at a minimum and when said alternating currents become out of phase with each other the unidirectional effect is correspondingly increased, and
   (b) the trip means is operated when a predetermined difference in phase exists between the alternating currents flowing in the circuits.

7. In an electric power transmission system:
(a) an alternating current power supply circuit and a load circuit,
(b) circuit interrupter means interconnecting said circuits and trip means therefor,
(c) first and second non-linear impedance means,
(d) means for deriving from each of said circuits a fundamental frequency current and a second harmonic thereof and applying them respectively to said first and second non-linear impedance means to generate unidirectional effects individual thereto corresponding to the flow of alternating current in said circuits respectively,
(e) means for balancing said unidirectional effects whereby as long as the flows of alternating current in said circuits bear a predetermined relation to each other said unidirectional effects are nullified, and
(f) means responsive to predetermined unbalancing of said unidirectional effects corresponding to change in said predetermined relation between said current flows in said circuits for operating said trip means to open said circuit interrupter means.

8. In an electric power transmission system:
(a) an alternating current power supply circuit and a load circuit,
(b) circuit interrupter means interconnecting said circuits and trip means therefor,
(c) non-linear impedance means,
(d) means for deriving from said system a fundamental frequency current and a current which is a second harmonic of said fundamental frequency current,
(e) means including a transmitter modulated by at least one of said currents and a receiver therefor and providing at least a current flow corresponding to said one current,
(f) means for applying said one current from said receiver and the other current to said non-linear impedance means to generate a unidirectional effect, and
(g) means interconnecting said non-linear impedance means and said trip means whereby the latter is operated to open said circuit interrupter means when said unidirectional effect reaches a predetermined value corresponding to a predetermined flow of alternating current in said system.

9. The invention, as set forth in claim 8, wherein the transmitter is a radio transmitter and the receiver is a radio receiver tuned to said transmitter.

10. The invention, as set forth in claim 9, wherein:
(a) the radio transmitter is modulated by the fundamental frequency current and its second harmonic, and
(b) the radio receiver provides in its output currents corresponding to said fundamental frequency current and its second harmonic and they are applied to the non-linear impedance means.

11. The invention as set forth in claim 9, wherein:
(a) the fundamental frequency is derived from the load circuit and the second harmonic is derived from the power supply circuit,
(b) the radio transmitter is modulated by the second harmonic current and the radio receiver provides in its output a current corresponding to said second harmonic current, and
(c) the trip means is operated on predetermined flow of alternating current in the power supply circuit.

12. In a polyphase electric power transmission system:
(a) a polyphase alternating current power supply circuit and a polyphase alternating current load circuit,
(b) circuit interrupter means interconnecting said polyphase circuits and trip means therefor,
(c) non-linear impedance means individual to each phase of said system,
(d) means for deriving from each phase a fundamental frequency and a current which is a second harmonic of said fundamental frequency current,
(e) means including a transmitter individual to each phase and modulated by at least one of said currents individual thereto and a receiver therefor and providing at least a current flow corresponding to said one current,
(f) means for each phase for applying said one current from its receiver and the other current individual thereto to the respective impedance means to generate a unidirectional effect, and
(g) means interconnecting said non-linear impedance means and said trip means whereby the latter is operated to open said circuit interrupter means when any of said unidirectional effects reaches a predetermined value corresponding to a predetermined flow of alternating current in the respective phase.

13. The invention, as set forth in claim 12, wherein the transmitter is a radio transmitter and the radio is a radio receiver therefor.

14. The invention, as set forth in claim 13, wherein each transmitter and its receiver are provided with antennas arranged and constructed for beam transmission from each transmitter to its receiver.

15. The invention, as set forth in claim 13, wherein each transmitter and its receiver operate on a frequency individual thereto.

16. In an electric power transmission system:
(a) a current power supply circuit and a load circuit,
(b) circuit interrupter means interconnecting said circuits and trip means therefor,
(c) means for deriving from said system a current the magnitude of which corresponds to the magnitude of the current flow in said system,
(d) means including a wave transmitter modulated by said derived current and a wave receiver therefor providing an output corresponding to said derived current, and
(e) means for applying said output of said receiver to said trip means for operating the same to open said circuit interrupter means when said current flow in said system reaches a predetermined value.

17. The invention, as set forth in claim 16, wherein the wave transmitter is a radio transmitter and the wave receiver is a radio receiver tuned thereto.

18. The invention, as set forth in claim 17, wherein the radio transmitter operates at the voltage of the system and is powered thereby.

19. The invention, as set forth in claim 17, wherein the system is a polyphase system and a radio transmitter and receiver are provided for each phase.

20. The invention, as set forth in claim 19, wherein each transmitter and its receiver are provided with antennas arranged and constructed for beam transmission from each transmitter to its receiver.

21. The invention, as set forth in claim 19, wherein each transmitter and its receiver operate on a frequency individual thereto.

22. In an electric power transmission system:
(a) an alternating current power supply circuit and a load circuit,
(b) circuit interrupter means interconnecting said circuits and trip means therefor including an energizing winding,
(c) means for deriving from said system an alternating current the magnitude of which corresponds directly to the magnitude of the alternating current flow in said system and the frequency of which is a multiple of the frequency of the alternating current flowing in said system, and
(e) means for applying said derived alternating current to said winding to energize it to open said circuit interrupter means when said alternating current flow in said system and thereby said derived alternating current reaches a predetermined value.

23. In an electric power transmission system:
 (a) an alternating current power supply circuit and a load circuit,
 (b) circuit interrupter means interconnecting said circuits and trip means therefor,
 (c) means for deriving from said system a sound wave the magnitude of which corresponds to the magnitude of the alternating current flow in said system, and
 (d) means for applying said derived sound wave to said trip means to open said circuit interrupter means when said alternating current flow in said system reaches a predetermined value.

24. The invention, as set forth in claim 23, wherein:
 (a) the sound wave is a composite sound wave containing a fundamental and its second harmonic, and
 (b) means convert the composite sound wave into a composite alternating current flow containing a corresponding fundamental and second harmonic and apply the same through non-linear impedance means to operate the trip means and open the circuit interrupter means.

25. The invention, as set forth in claim 24, wherein:
 (a) means shift the phase of one of the wave forms making up the composite sound wave with respect to the phase of the other wave form as a function of the magnitude of the alternating current flow in the system, and
 (b) the phase shifted composite sound wave is converted into a composite alternating current flow containing a correspondingly phase shifted fundamental and second harmonic.

26. In an electric power transmission system:
 (a) an alternating current power supply circuit and a load circuit,
 (b) circuit interrupter means interconnecting said circuits and trip means therefor,
 (c) means for deriving from said system a sound wave the magnitude of which corresponds to the magnitude of the alternating current flow in said system,
 (d) supersonic wave generating means operating at a predetermined frequency and modulated by said sound wave and sound wave receiving means therefor, and
 (e) means for applying the received sound wave to said trip means to open said circuit interrupter means when said alternating current flow in said system reaches a predetermined value.

27. Means for measuring current flow in a conductor of a high voltage alternating current power transmission line and transmitting the measurement to a remote point comprising:
 (a) a wave transmitter operating at the potential of said conductor,
 (b) means for energizing said transmitter in response to the voltage of the electric field of said conductor, and
 (c) means for modulating said transmitter in response to current flow in said conductor to transmit a corresponding signal to said remote point.

28. The invention, as set forth in claim 27, wherein means are provided for modulating the transmitter in response to the voltage of the conductor whereby the transmitted signal also includes a voltage component.

29. The invention, as set forth in claim 28, wherein the frequency of the voltage component of the transmitted signal is twice the frequency of the current component.

30. Means for measuring current flow in a conductor of a high voltage alternating current power transmission line and transmitting the measurement to a remote point comprising:
 (a) a wave transmitter operating at the potential of said conductor,
 (b) means for energizing said transmitter in response to the voltage of the electric field of said conductor through a non-linear impedance device, and
 (c) means for modulating said transmitter in response to current flow in said conductor to transmit a corresponding signal to said remote point.

31. Means for measuring current flow in a conductor of a high voltage alternating current power transmission line and transmitting the measurement to a remote point comprising:
 (a) a wave transmitter operating at the potential of said conductor,
 (b) a metallic shield surrounding said conductor in insulated spaced relation,
 (c) means for energizing said transmitter from current flow as a result of the voltage between said shield and said conductor, and
 (d) means for modulating said transmitter in response to current flow in said conductor to transmit a corresponding signal to said remote point.

32. The invention, as set forth in claim 31, wherein the metallic shield is the antenna for the radio transmitter.

33. The invention, as set forth in claim 31, wherein the metallic shield is longitudinally slotted to receive the conductor therethrough.

34. Means for measuring current flow in a conductor of a high voltage alternating current power transmission line and transmitting the measurement to a remote point comprising:
 (a) a wave transmitter operating at the potential of said conductor,
 (b) means for energizing said transmitter in response to the voltage of the electric field of said conductor,
 (c) a Hall plate traversed by magnetic flux generated around said conductor as a function of current flow therein, and
 (d) circuit means interconnecting said Hall plate and said transmitter to apply an alternating modulating potential thereto the magnitude of which is a function of the magnetic flux acting on said Hall plate to transmit a corresponding signal to said remote point.

35. The invention, as set forth in claim 27, wherein current flow due to the voltage drop along the conductor as a result of current flow therethrough modulates the transmitter.

36. The invention, as set forth in claim 27, wherein the transmitter is frequency modulated as a function of the current flow in the conductor.

37. Means for measuring current flow in a conductor of a high voltage alternating current power transmission line and transmitting the measurement to a remote point comprising:
 (a) a wave transmitter operating at the potential of said conductor,
 (b) means for energizing said transmitter in response to the voltage of the electric field of said conductor, and
 (c) an oscillator in said transmitter having a modulating inductor with a ferrite core positioned in the magnetic field generated by current flow in said conductor,
 (d) the permeability of said ferrite core changing at the frequency of the current in said conductor to generate in said inductor a modulating frequency twice that of the current in said conductor with the percentage modulation being a function of the magnitude of the current in said conductor to transmit a corresponding signal to said remote point.

38. Measuring means for a conductor of a high voltage alternating power transmission line and means for transmitting the measurement to a remote point comprising:
 (a) a wave transmitter operating at the potential of said conductor and modulated in response to a variable characteristic of the energization thereof, and
 (b) a metallic shield in insulated spaced relation to said conductor and enclosing said wave transmitter and acting to shield it from the effects of corona discharge from said conductor.

39. The invention, as set forth in claim 38, wherein the wave transmitter is a radio transmitter and the metallic shield is connected to the radio transmitter and acts as an antenna therefor.

40. Means for measuring the flow of alternating current in a conductor of a high voltage power transmission line and transmitting to a remote point a signal varying according to the magnitude of said alternating current comprising: a radio transmitter operating at the potential of said conductor including a transmission oscillator having a frequency control circuit with a crystal therein for generating a transmission frequency of predetermined value, and means for modulating said transmission frequency with alternating current the frequency of which bears a direct relation to the frequency of the alternating current in said conductor.

41. Means for measuring the flow of current in a high voltage power transmission line and transmitting it to a remote point comprising: a wave transmitter adapted to operate at the potential of said conductor and to be energized and modulated by current flow therein, a wave receiver at said remote point adapted to provide an output corresponding to said current flow, and means for directing the wave form of energy from said transmitter to said receiver along a predetemined path having a limited transverse dimension.

42. In an electric power transmission system:
 (a) a current power supply circuit and a load circuit,
 (b) circuit interrupter means interconnecting said circuits and trip means therefor,
 (c) means for deriving from said system a current the magnitude of which corresponds to the magnitude of the current flow in said system,
 (d) means including a wave transmitter modulated by said derived current and a wave receiver therefor providing an output corresponding to said derived current,
 (e) means for directing the modulated wave form of energy from said wave transmitter to said wave receiver along a predetermined path having a limited transverse dimension, and
 (f) means for applying said output of said receiver to said trip means for operating the same to open said circuit interrupter means when said current flow in said system reaches a predetermined value.

43. In an electric power transmission system:
 (a) a current power supply circuit and a load circuit,
 (b) circuit interrupter means interconnecting said circuits and trip means therefor,
 (c) means for deriving from said system a current the magnitude of which corresponds to the magnitude of the current flow in said system,
 (d) means including a wave transmitter adapted to operate at the potential of said system and to be energized by and modulated by said derived current and a wave receiver therefor providing an output corresponding to said derived current,
 (e) means for directing the modulated wave form of energy from said wave transmitter to said wave receiver along a predetermined path having a limited transverse dimension, and
 (f) means for applying said output of said receiver to said trip means for operating the same to open said circuit interrupter means when said current flow in said system reaches a predetermined value.

44. In an electric power transmission system:
 (a) a current power supply circuit and a load circuit,
 (b) circuit interrupter means interconnecting said circuits and trip means therefor,
 (c) means for deriving from said system a current the magnitude of which corresponds to the magnitude of the current flow in said system,
 (d) means including a radio transmitter modulated by said derived current and a radio receiver therefor providing an output corresponding to said derived current,
 (e) said radio transmitter including a transmission oscillator having a frequency control circuit with a crystal therein for generating a transmission frequency of predetermined value, and
 (f) means for applying said output of said receiver to said trip means for operating the same to open said circuit interrupter means when said current flow in said system reaches a predetermined value.

45. In an electric power transmission system:
 (a) a current power supply circuit and a load circuit,
 (b) circuit interrupter means interconnecting said circuits and trip means therefor,
 (c) means for deriving from said system a current the magnitude of which corresponds to the magnitude of the current flow in said system,
 (d) means including a radio transmitter modulated by said derived current and a radio receiver therefor providing an output corresponding to said derived current,
 (e) said radio transmitter including a zener diode normally non-conducting and adapted to be rendered conducting when said current flow reaches a predetermined value to cause said radio transmitter to transmit to said radio receiver, and
 (f) means for applying said output of said receiver to said trip means for operating the same to open said circuit interrupter means.

46. Means for measuring current flow in a conductor of a high voltage power transmission line and transmitting the measurement to a remote point comprising:
 (a) a transmitter arranged and adapted to operate at the potential of said conductor, and
 (b) means for modulating said transmitter in response to the magnitude of the current flow in said conductor including circuit connections to spaced points therealong between which a voltage drop appears that is a function of said current flow.

References Cited by the Examiner
UNITED STATES PATENTS

| | | | |
|---|---|---|---|
| 1,929,059 | 10/1933 | Fitzgerald | 317—27 |
| 2,384,375 | 9/1945 | Hayward | 317—27 |
| 2,474,290 | 6/1949 | Terry et al. | 317—27 |
| 2,574,458 | 10/1951 | Atkinson et al. | 340—310 |
| 2,594,371 | 11/1952 | Ward | 340—310 |
| 2,624,794 | 1/1953 | Gooding | 340—310 |
| 2,863,100 | 12/1958 | Rice | 317—27 |
| 3,138,742 | 6/1964 | Schweitzer | 317—27 |

SAMUEL BERNSTEIN, *Primary Examiner.*